(12) United States Patent
Kubota et al.

(10) Patent No.: US 8,488,410 B2
(45) Date of Patent: Jul. 16, 2013

(54) UNDERWATER DETECTION DEVICE

(75) Inventors: Osamu Kubota, Nishinomiya (JP);
Yoshihiro Nishiyama, Nishinomiya (JP); Yumiko Furukawa, Nishnomiya (JP)

(73) Assignee: Furuno Electric Company Limited, Nishinomiya-shi (JP)

( * ) Notice: Subject to any disclaimer, the term of this patent is extended or adjusted under 35 U.S.C. 154(b) by 0 days.

(21) Appl. No.: 13/439,010

(22) Filed: Apr. 4, 2012

(65) Prior Publication Data

US 2012/0195167 A1 Aug. 2, 2012

Related U.S. Application Data

(63) Continuation of application No. 12/012,033, filed on Jan. 31, 2008, now Pat. No. 8,207,864.

(30) Foreign Application Priority Data

Jan. 31, 2007 (JP) ................................ 2007-022279

(51) Int. Cl.
*G01S 15/96* (2006.01)

(52) U.S. Cl.
USPC ......................................................... 367/110

(58) Field of Classification Search
USPC ..................... 367/99, 110, 111, 107; 340/850
See application file for complete search history.

(56) References Cited

U.S. PATENT DOCUMENTS

| | | | |
|---|---|---|---|
| 5,805,528 A * | 9/1998 | Hamada et al. | 367/111 |
| 6,801,474 B2 | 10/2004 | Preston | |
| 6,829,197 B2 | 12/2004 | Erikson | |
| 6,934,657 B1 * | 8/2005 | Carlson et al. | 702/130 |
| 7,254,483 B2 | 8/2007 | Squires et al. | |
| 7,272,075 B2 | 9/2007 | Pope | |
| 8,207,864 B2 * | 6/2012 | Kubota et al. | 340/850 |
| 2001/0026499 A1 * | 10/2001 | Inouchi | 367/111 |
| 2007/0291589 A1 | 12/2007 | Kawabata | |
| 2010/0283628 A1 | 11/2010 | Kubota et al. | |
| 2012/0195167 A1 * | 8/2012 | Kubota et al. | 367/88 |

FOREIGN PATENT DOCUMENTS

| | | | |
|---|---|---|---|
| JP | 56079978 A | * | 6/1981 |
| JP | 04-339288 A | | 11/1992 |
| JP | 2002-090453 A | | 3/2002 |

(Continued)

OTHER PUBLICATIONS

Translation of JP 56-079978.*
Office Action dated Sep. 16, 2011 in U.S. Appl. No. 12/012,033.
Notice of Allowance dated Mar. 16, 2012 in U.S. Appl. No. 12/012,033.

(Continued)

*Primary Examiner* — Daniel Pihulic
(74) *Attorney, Agent, or Firm* — Nutter McClennen & Fish LLP; John J. Penny, Jr.; Christina M. Sperry

(57) ABSTRACT

An underwater detection device for detecting underwater by transmission and reception of an ultrasonic signal is provided. The device includes a transmission module for transmitting the ultrasonic signal underwater, a reception module for receiving an echo signal of the transmitted ultrasonic signal, a bottom detection module for detecting a bottom based on the echo signal from the bottom, a bottom-sediment determination module for calculating probabilities of the bottom sediment on how much the bottom sediment contains each of predetermined bottom sediment types based on the echo signal and a bottom-sediment display module for displaying a texture representing each of the bottom sediment types below the bottom being displayed based on the probabilities.

14 Claims, 8 Drawing Sheets

FOREIGN PATENT DOCUMENTS

| | | |
|---|---|---|
| JP | 2004003940 A | 1/2004 |
| JP | 2004-093429 A | 3/2004 |
| JP | 2006208110 A | 8/2006 |
| JP | 2006220468 A | 8/2006 |

OTHER PUBLICATIONS

Supplemental Notice of Allowance dated May 11, 2012 in U.S. Appl. No. 12/012,033.

* cited by examiner

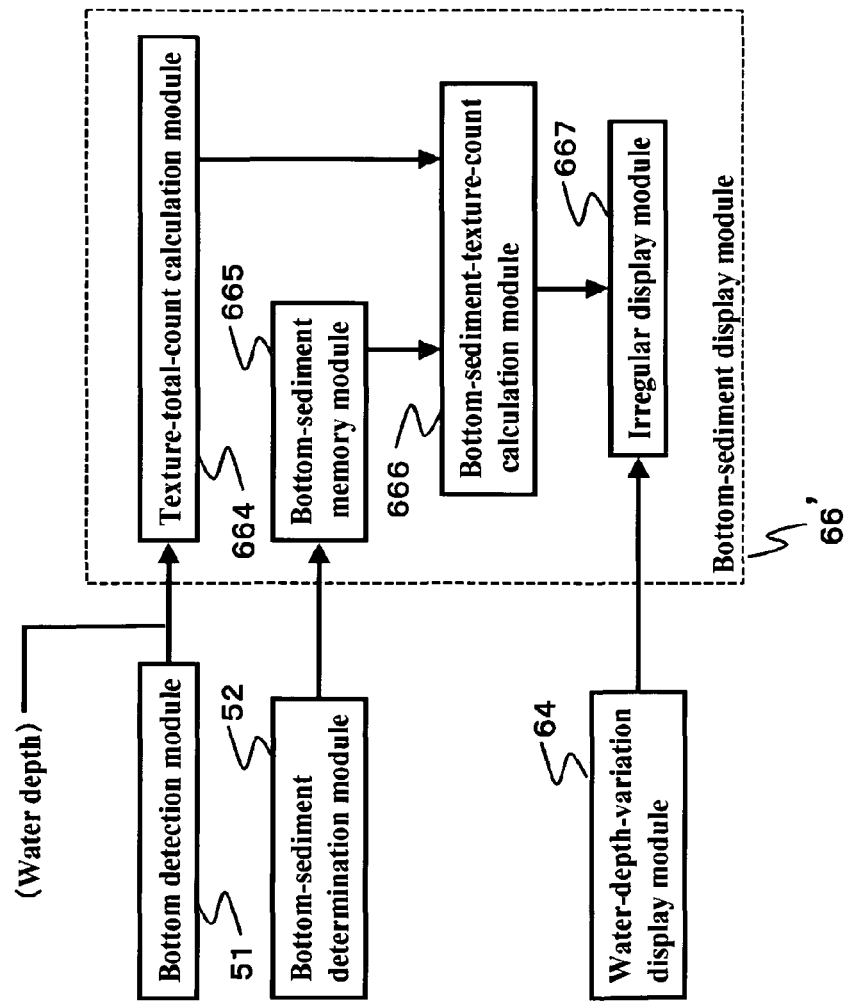

UNDERWATER DETECTION DEVICE

CROSS-REFERENCE TO RELATED APPLICATIONS

This application claims priority under 35 U.S.C. §119 to Japanese Patent Application No. 2007-022279, now JP4932512B, which is filed on Jan. 31, 2007, the entire disclosure of which is hereby incorporated by reference, and priority under 35 U.S.C.§120 to U.S. patent application Ser. No. 12/012,033, now U.S. Pat. No. 8,207,864, which is filed on Jan. 31, 2008, the entire disclosure of which is hereby incorporated by reference.

TECHNICAL FIELD

The present invention relates to an underwater detection device for detecting underwater conditions by transmission and reception of an ultrasonic signal.

BACKGROUND

As shown in FIG. 1, a conventional underwater detection device 1 receives an echo of an ultrasonic wave transmitted underwater from a ship bottom, and displays based on the received echo level, etc. Such an underwater detection device 1 typically includes a calculation module 500, a transmission module 100, a transmission/reception switching module 200, a transducer 300, a reception module 400 and a display module 600. Hereinafter, the detection and display method of the underwater detection device 1 will be explained.

First, the transmission module 100 amplifies a transmission drive signal. The transmission drive signal is applied to the transducer 300 through the transmission/reception switching module 200, and the module 200 then transmits the ultrasonic signal. The transmitted ultrasonic signal is reflected by an object in water, such as a fish or a bottom, and the echo signal is received by the transducer 300. The received echo signal passes through the transmission/reception switching module 200, and then the signal is processed, such as band restriction and amplification by the reception module 400. The processed signal is calculated by the calculation module 500 so as to be displayed, and a predetermined display is then performed by the display module 600. The calculation module 500 typically includes a bottom detection module 51, a bottom-sediment determination module 52, a fish detection module 53, and a fish-length calculation module 54. The display module 600 typically includes a bottom-sediment display module 61 and a fish-length display module 62.

The bottom detection module 51 and the fish detection module 53 calculate positions of fish or bottom based on a time required for the transducer 300 from the transmission of the ultrasonic signal to the reception of the echo signal from the fish or bottom. The bottom-sediment determination module 52 determines a bottom sediment type based on the echo level from the bottom, etc. The determination results for the bottom sediment type includes information, such as the echo level from the bottom itself, the echo level from secondary reflection, temporal variations of these echo levels, a determined bottom sediment type, or the like. The fish-length calculation module 54 calculates a size of the fish (i.e., fish length) based on the echo level from the fish.

FIG. 2 is a display example of a fish finder having such a configuration as described above, such as disclosed in Japanese Unexamined Patent Publication No. 2002-90453. As shown in FIG. 2, the bottom-sediment display module 61 displays predetermined colors associated with the bottom sediment types (from A1 to A4) at the bottom of a display screen based on the bottom sediment types determined by the bottom-sediment determination module 61.

Further, Japanese Unexamined Patent Publication No. 2004-93429 discloses a similar display configuration in FIG. 2 thereof, this display configuration displays colors corresponding to first through Nth echo signals from the bottom are displayed using N blocks on a separate display screen from the display screen on which a shoal of fish are displayed.

Returning to FIG. 2, the fish-length display module 62 displays a symbol representing a fish in a size corresponding to the fish length calculated by the fish-length calculation module 54. The symbol may be colored based on the echo level and may be textured as similar to that of the actual fish. Further, the fish-length display module 62 displays characters, such as a number indicating the fish length in proximity to the displayed fish symbol.

Hereinafter, further referring to FIG. 2, a display example displayed by the display module 600 of the underwater detection device 1 will be explained. In FIG. 2, the vertical axis indicates water depth and the horizontal axis indicates time. Further, because the fish finder transmits ultrasonic signals perpendicularly downward, the display screen is updated one vertical line at a time according to each transmission and reception, while the display screen is scrolled to the left. Thus, the latest data is always displayed at the right end of the display screen.

In FIG. 2, A1 to A4 (i.e., echo images) are displayed by the bottom-sediment display module 61 to display the bottom sediment. The echo images A1-A4 are represented by colors according to the types of the corresponding bottom sediment sections. "B" is a texture displayed by the first fish-length display module 62, and the texture has a size corresponding to the fish length. The texture is an imitation of the fish appearance, and typically is provided with several sizes according to fish length. Further, "C" is a character or number displayed in proximity to the texture B to indicate the fish length. "D" is an echo image of a shoal of fish, "E" is a character or number indicating a water depth, "F" is an echo image of a bottom, and "G" is an echo image of an oscillation line.

However, as mentioned above, the display configuration for the bottom sediment of the conventional underwater detection device only distinguishes the bottom-sediment types by color tone, and a user cannot intuitively distinguish the bottom sediment types only by viewing the display screen. That is, in order to determine the bottom sediment types, the correspondence of the colors to the bottom sediment types must be understood. Further, Japanese Unexamined Patent Publication No. 2004-93429 also discloses a more accurate bottom sediment type determination which can be facilitated by displaying the first to Nth echo signals from the bottom in predetermined display areas and positions. However, this arrangement requires the user's subjectivity or experiences.

Further, for the display corresponding to the fish, the device solely displays the fish texture corresponding to the level of echo signal. Therefore, the determination of fish type requires the user's experiences.

SUMMARY

In order to address these problems, the present invention provides an underwater detection device capable of allowing a user to intuitively determine a bottom sediment type and a fish type, as well as an underwater condition from a display screen without depending on the user's experiences. The underwater detection device may be able to express the underwater condition with more accuracy by associating water depth information and water temperature information with the display of the bottom sediment or the fish.

According to one aspect of the invention, an underwater detection device for detecting underwater by transmission and reception of an ultrasonic signal is provided. The device includes a transmission module for transmitting the ultrasonic signal underwater, a reception module for receiving an echo signal of the transmitted ultrasonic signal, a bottom detection module for detecting a bottom based on the echo signal from the bottom, a bottom-sediment determination module for calculating probabilities of the bottom sediment on how much the bottom sediment contains each of predetermined bottom sediment types based on the echo signal, and a bottom-sediment display module for displaying a texture representing each of the bottom sediment types below the bottom being displayed based on the probabilities.

The underwater detection device may further includes a texture-total-count calculation module for calculating a total count of the texture to be displayed below the bottom, and a bottom-sediment-texture-count calculation module for calculating a texture count for each of the bottom sediment types based on the total count of the texture and the probabilities calculated by the bottom sediment determination module. The bottom-sediment display module may display based on the texture count for each of the bottom sediment types calculated by the bottom-sediment-texture-count calculation module.

The underwater detection device may further include a bottom-sediment memory module for storing the probabilities of the past calculated by the bottom-sediment determination module. The bottom-sediment-texture-count calculation module may calculate the texture count for each of the bottom sediment types based on the probabilities stored in the bottom-sediment memory module.

The underwater detection device may further include a fish detection module for detecting a fish based on the echo signal received by the reception module, a fish-type determination module for determining a type of the fish based on at least one of the echo signals, water temperature, water quality, water area and depth, and a fish-type display module for displaying a texture representing the fish type based on the fish type determined by the fish-type determination module.

The underwater detection device may further include a first water-depth-variation display module for varying the texture representing the bottom sediment or the fish depending on a water depth.

The underwater detection device may further include a second water-depth-variation display module for displaying a background to which gradation is applied based on a water depth.

According to another aspect of the invention, an underwater detection device for detecting underwater by transmission and reception of an ultrasonic signal is provided. The device includes a water-depth-variation display module for displaying a background to which gradation is applied based on a water depth.

The water-depth-variation display module may apply the gradation only to a predetermined water depth range.

The underwater detection device may further include a water-temperature-variation display module for displaying a background to which a color is applied based on a water temperature. The gradation applied by the water-depth-variation display module may be a darkness of the color of the background.

BRIEF DESCRIPTION OF THE DRAWINGS

FIG. 7 is a block diagram showing a configuration of an underwater detection device according to Embodiment 2 of the present invention.

DETAILED DESCRIPTION OF THE PREFERRED EMBODIMENT (Embodiment 1)

Figure 1:
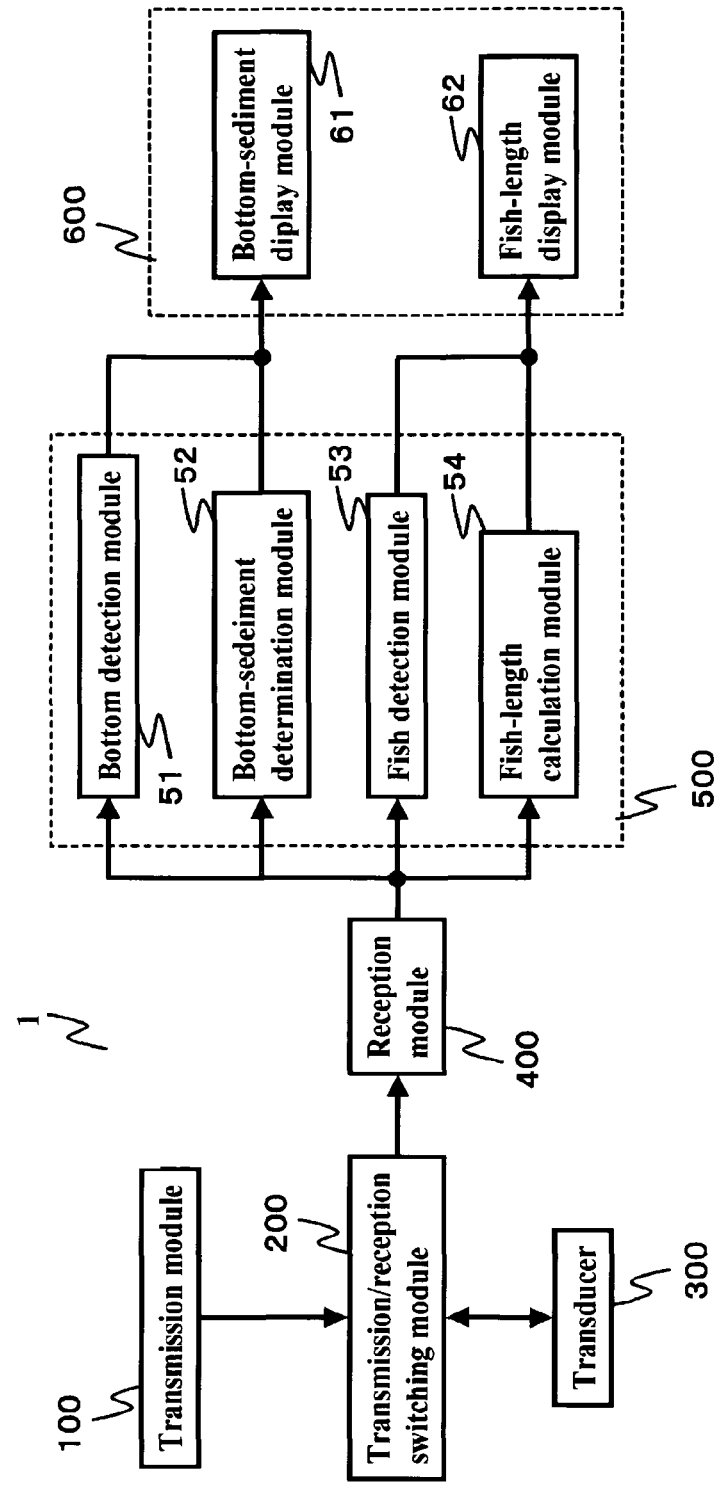
FIG. 1 is a block diagram showing a configuration of a conventional underwater detection device.
Figure 2:
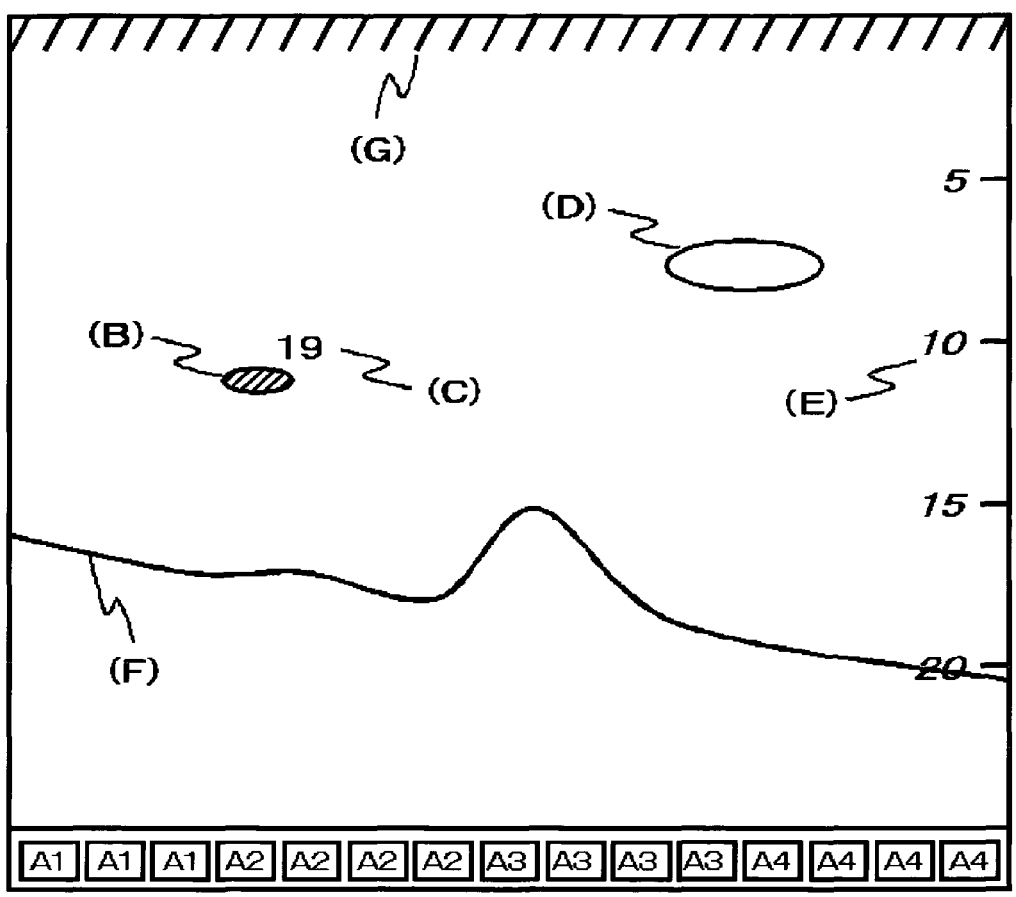
FIG. 2 is a view showing a display configuration by the conventional underwater detection device shown in FIG. 1.
Figure 3:
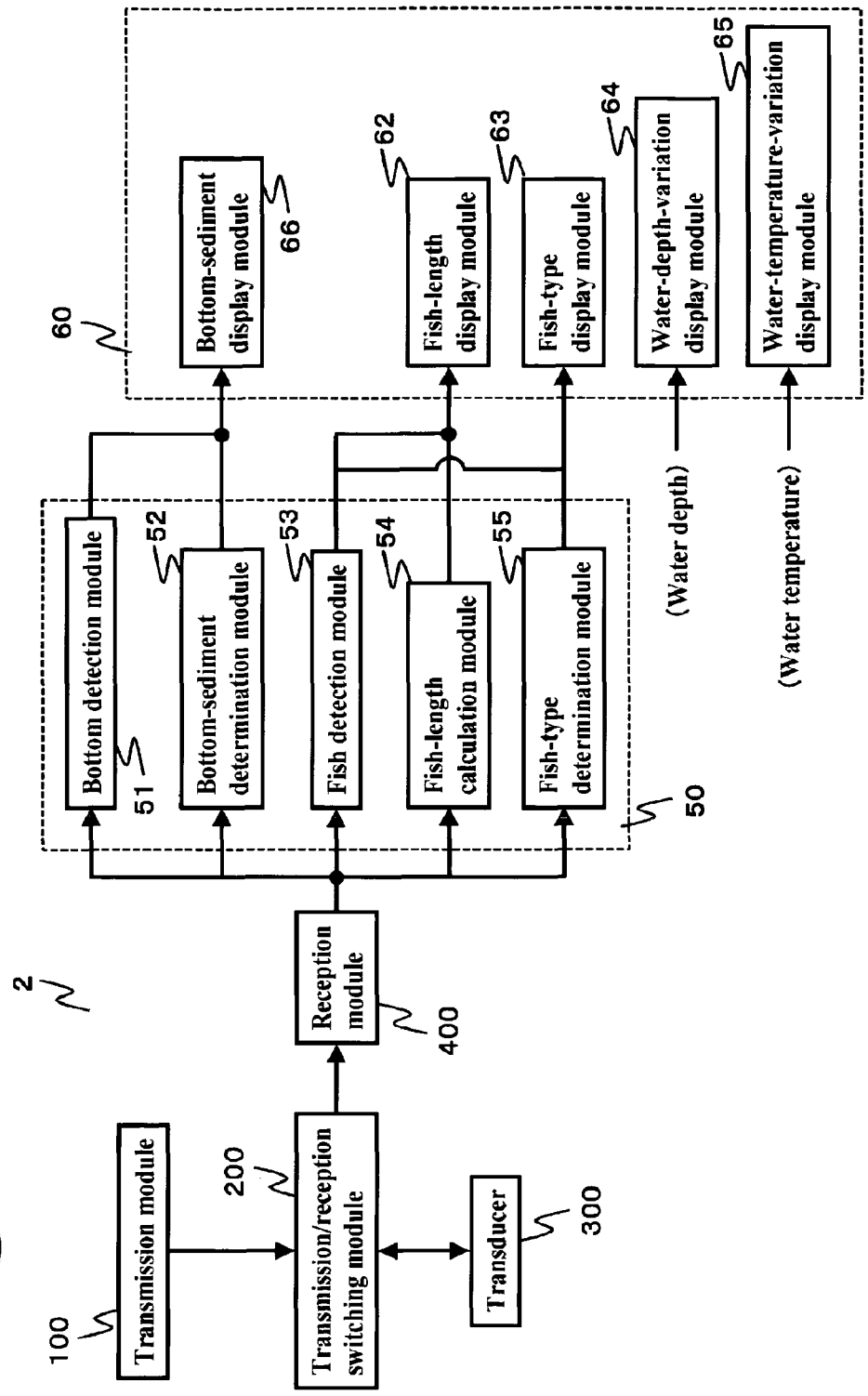
FIG. 3 is a block diagram showing a configuration of an underwater detection device according to Embodiment 1 of the present invention.

Hereinafter, an underwater detection device 2 according to Embodiment 1 of the present invention will be explained referring to FIGS. 3, 4, 5A-5C, 6A and 6B. First, as shown in FIG. 3, the underwater detection device 2 includes a transmission module 100, a transmission/reception switching module 200, a transducer 300, a reception module 400, a calculation module 50, and a display module 60. In this embodiment, the transmission module 100, transmission/reception switching module 200, transducer 300, and reception module 400 are similar to that of the conventional underwater detection device 1 described above and, thus, explanations thereof will be omitted herein. Hereinafter, specific processes of the calculation module 50 and the display module 60 will be explained.

The calculation module 50 includes a bottom detection module 51, a bottom-sediment determination module 52, a fish detection module 53, a fish-length calculation module 54, and a fish-type determination module 55. In this embodiment, the bottom detection module 51, bottom-sediment determination module 52, fish detection module 53, and fish-length calculation module 54 are similar to that of the conventional underwater detection device 1 described above and, thus, explanations thereof will be omitted herein.

The fish-type determination module 55 determines a fish type based on at least one of an echo signal from the fish detected by the fish detection module 53, water temperature, water quality, water area, and water depth. For example, the module 55 may determine a fish type that produces a typical echo signal based on the detected echo signal, and may determine a fish type that inhabits in water at high or low water temperature based on the detected water temperature. Further, the module 55 may determine a fish type that inhabits in freshwater or saltwater based on the detected water quality, and may determine a fish type that inhabits in a typical area or water depth based on detected the water area or water depth. Further, the module 55 may narrow down the fish type by combining the detections of different detectors. Here, the information, such as the water temperature, water quality, water area, or water depth, for the determination of the fish type may be manually inputted by the user, or may be automatically acquired from a water thermometer, a water quality meter, a positioning system, the bottom detection module 51, etc.

The display module 60 includes a bottom-sediment display module 66, a fish-length display module 62, a fish-type display module 63, a water-depth-variation display module 64, a water-temperature-variation display module 65. In this embodiment, the fish-length display module 62 is similar to that of the conventional underwater detection device 1 and thus, explanation thereof will be omitted herein.

The bottom-sediment display module 66 displays a texture representing a bottom sediment based on the determination result of the bottom-sediment determination module 52, below the displayed bottom in accordance with the detection by the bottom detection module 51. As shown in Table 1 below, the determination result of the bottom-sediment determination module 52 includes probabilities of which a bottom sediment type corresponds to which bottom sediment among predetermined two or more types of the bottom sediments, such as rocks, sands, stones, or mud.

TABLE 1

| Parameter | Depth | Rocks | Sands | Stones | Mud |
|---|---|---|---|---|---|
| Texture | | ■ | ▨ | ▢ | ■ |
| Data | 20 m | 70 (%) | 30 (%) | 0 (%) | 0 (%) |

Table 1 shows an example of the water depth and the corresponding probabilities of the bottom sediment types (hereinafter, referred to as "bottom sediment data") where the water depth is 20 m. This data shows the probabilities in which the bottom sediment contains 70% of rocks, 30% of sands, 0% of stones and 0% of mud. The bottom-sediment display module 66 displays a texture of the bottom sediment type with the highest probability among those determined.

The displayed textures may extend to the bottom of the display screen, and if a texture size is larger than an area into which the texture is displayed, the oversized texture portion may be hided without being displayed, while if the texture size is smaller than the area into which the texture is displayed, two or more textures may be used. Next, the display method when the texture is smaller than the area will be explained referring to FIG. 4, and FIGS. 5A-5C that show display examples.

Figure 4:
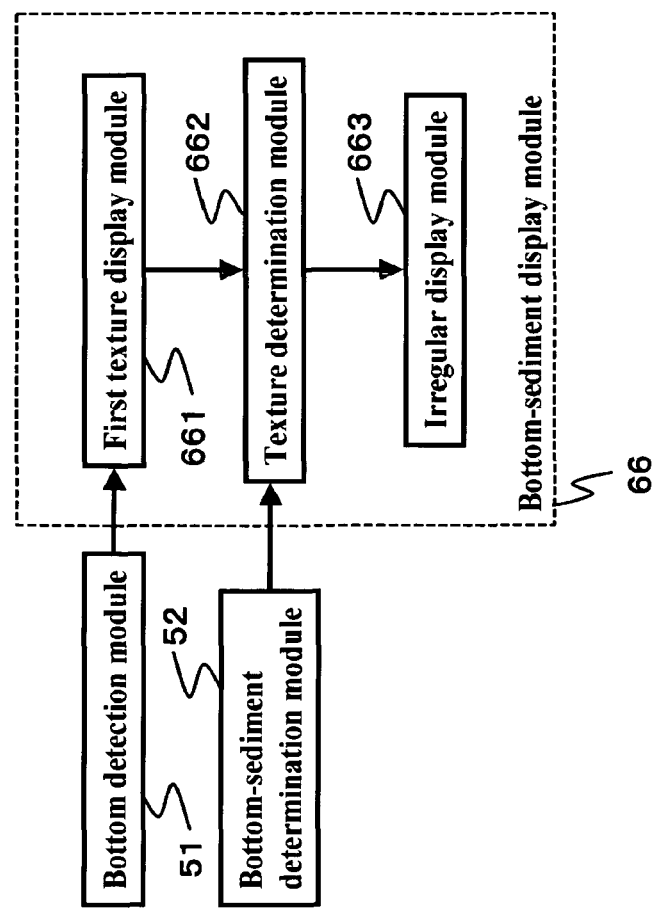
FIG. 4 is a view showing another configuration of the underwater detection device according to Embodiment 1 of the present invention.
Figure 5A:
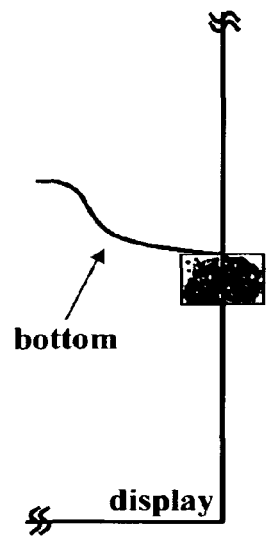
FIGS. 5A-5C are views showing display positions of textures representing bottom sediment.
Figure 5B:
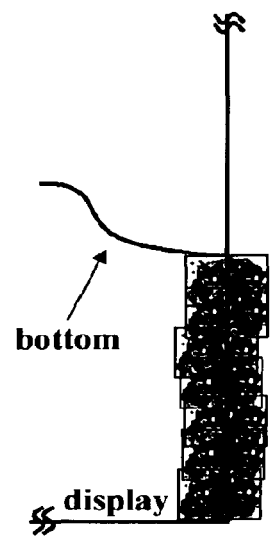
Figure 5C:
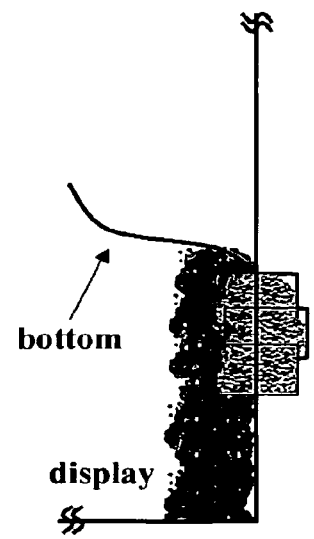

As shown in FIG. 4, the bottom-sediment display module 66 includes a first texture display module 661, a texture determination module 662 and an irregular display module 663. FIGS. 5A-5C show a lower right section of the display screen of the underwater detection device 2, and in these figures, a square frame is provided around each texture for easier view. This display screen is by a SVGA (i.e., resolution of 800×600 dots), a texture size (one block) is 30×40 dots (vertical× horizontal) and detection information obtainable from one transmission and reception is 800×1 dots (one line in the vertical direction). Further, the detection information is typically updated for every one transmission and reception to scroll the display screen from the right to the left.

First, the first texture display module 661 displays a first texture in the bottom display area. This bottom corresponding to the first texture is detected by the bottom detection module 51. The water depth may be calculated by multiplying a half of a time necessary for transmission of an ultrasonic wave and reception of the echo signal from the bottom by the transducer 300, by a propagation rate of the ultrasonic wave.

The first texture may be updated every 20 transmissions and receptions. Further, as shown in FIG. 5A, an upper portion of the first texture contacts the bottom surface, and a lateral half portion of the texture (e.g., 20 dots) is displayed on the display screen.

The texture determination module 662 determines a type of the texture to be displayed. As described above, the texture to be displayed represents the bottom sediment type with the highest probability among those calculated by the bottom-sediment determination module 52. The textures may, but not limited to, be stored in the memory corresponding to the bottom sediment types. One texture may correspond to one of the bottom sediment types. Alternatively, two or more similar textures may be stored for one of the bottom sediment types to select one of the textures.

As shown in FIG. 5B, the textures may be sequentially displayed at least to the bottom of the display screen by the irregular display module 663. Specifically, the module 663 sequentially displays the textures so as to be irregularly overlapped for each other by 5-10 dots (approximately, ¼ of a texture) in the vertical direction so that an irregular display pattern is created. Similarly, in the horizontal direction, the textures may be displayed so as to overlap for each other within ±5 dots.

Alternatively, if two or more similar textures are provided for a bottom sediment type as described above, these textures may not be overlapped, and instead, the two or more similar textures may be arranged to create an irregular display pattern. Alternatively, the same texture of different sizes may provide a similar effect.

Thus, as, shown in FIG. 5C, each time the detection information is updated, the textures in the corresponding line shift by one line at a time to the left, and when the display information for 20 dots is updated in the horizontal direction, the next textures are displayed as shown in FIGS. 5A and 5B. Here, when the next texture overlaps the previous texture, the next texture may be displayed so as to overlie the previous texture. As described above, the underwater detection device of this embodiment can realistically display the bottom sediment and, thus, the user with a few experiences can also easily know the bottom sediment type.

Display order of the textures in the vertical direction may be towards the bottom end of the display screen from the bottom (of water), or towards the bottom (of water) from the bottom end of the display screen. Alternatively, the vertical display area on which the textures are to be displayed may be calculated in advance to display all of the textures simultaneously. The bottom sediment may be more realistically displayed by obscuring the texture boundary. The information acquired by one transmission and reception is not limited to one line in the vertical direction on the display screen, and the display updating cycle of the texture is not limited to 20 transmissions and receptions.

The fish-type display module 63 displays textures representing a fish type based on the determination of the fish-type determination module 55. Specifically, the texture representing the determined fish type may be displayed so that the center of gravity of an area corresponding to the echo from the fish (i.e., this location may be the same as where the fish detected by the fish detection module 53 should be displayed) and the center of gravity of the texture are arranged at the same location on the display screen. The texture size may, but not limited to be fixed. The texture size may vary based on the fish length by the fish-length display module 62. With the above configuration, the underwater condition can be realistically displayed, while increasing the amount of information provided and, thus, the fish type can be understood even by the user with a few experiences.

Figure 6A:
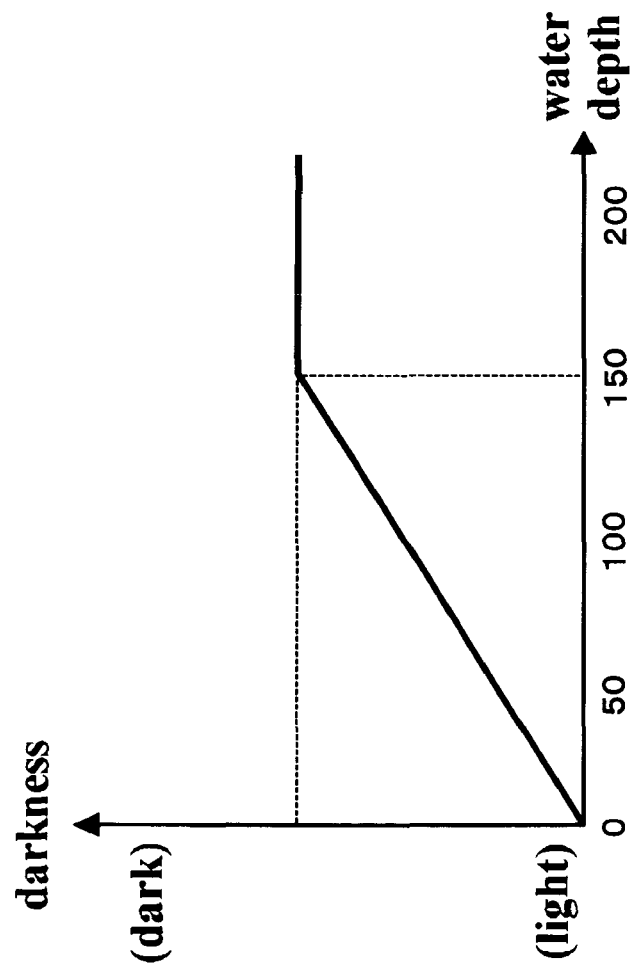
FIGS. 6A and 6B are views showing a relationship between a water depth and gradation.
Figure 6B:
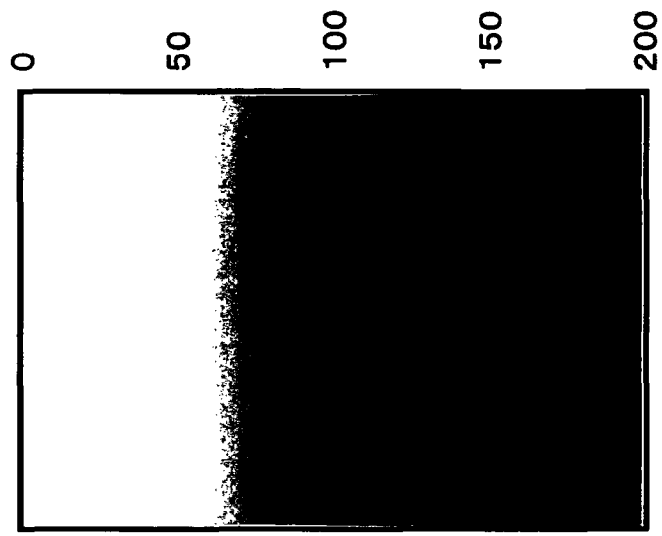

The water-depth-variation display module 64 displays a background to which gradation is applied based on the water depth. Specifically, the gradation may be darker in color for deeper water depth, as shown in FIG. 6B. FIG. 6A shows a relationship between the water depth and the darkness of the background, and FIG. 6B shows an example of the display screen to which the gradation is applied. Therefore, the water depth information can be graphically displayed with the underwater condition that is described as above. Further, the water depth of 150 m or deeper, or vice versa, may also be displayed in the same darkness in color to clearly distinguish the water depth of 150 m. The relationship between the water depth and the background gradation may be automatically varied based on the displayed range, or may be manually set by the user. Further, the gradation may not be limited to the darkness in color, but may be expressed by different colors, brightness, etc.

Further, the color and contour of the texture displayed by the bottom-sediment display module 66 and the fish-type display module 63 may be changed based on the water depth by the water-depth-variation display module 64. For example, as the water depth becomes deeper, the chrome or brightness of the texture may be reduced, or the contour may be graded or fuzzily displayed (e.g., blurred). By configuring as described above, even in a case that the background is a single color to emphasize on the other information, such as the texture, the water depth information can be provided by the texture instead of the background to clearly indicate the water depth variation.

The water-temperature-variation display module 65 displays the background to which color is applied based on the water temperature. For example, blue may be displayed for a low water temperature, and red may be displayed for a high water temperature. Therefore, the underwater temperature environment can be expressed and, thus, the user can more easily understand the underwater condition. Further, the color displayed by the water-temperature-variation display module 65 may be combined to add the gradation of the water-depth-variation display module 64 to it to have the both effects. The information on the water temperature may be directly inputted by the user, or may be automatically acquired from an appropriate device, such as the water thermometer.

(Embodiment 2)

The underwater detection device 2 according to Embodiment 2 causes a bottom-sediment display module 66' to display the textures in accordance with the probabilities of the bottom sediment types based on the determined bottom sediment types (i.e., bottom sediment data). For example, the number of textures proportional to the probability of one bottom sediment type may be calculated and the textures of the number for each bottom sediment type are displayed. By this configuration, the user can easily view the bottom sediment types simply from the display screen, and can also understand the probability of each bottom sediment type. Hereinafter, a specific operation of the bottom-sediment display module 66' will be explained. The other configuration of Embodiment 2 is similar to that of Embodiment 1 and, thus, explanation thereof will be omitted.

As shown in FIG. 7, the bottom-sediment display module 66' includes a texture-total-count calculation module 664, a bottom-sediment memory module 665, a bottom-sediment-texture-count calculation module 666 and an irregular display module 667.

The texture-total-count calculation module 664 calculates the total count of the textures required for an area where the bottom sediment information is displayed below the bottom surface detected by the bottom detection module 51. The total count of the textures is calculated by dividing the area where the textures are displayed by the texture size to be placed. In this embodiment, the area where the bottom sediment information is displayed is an area from the water depth of the bottom detected by the bottom detection module 51 to the water depth corresponding to the bottom end of the display screen.

The bottom-sediment memory module 665 stores the information on the bottom sediment determined by the bottom-sediment determination module 52. The bottom sediment information includes probabilities of certain bottom sediment on how much the bottom sediment contains each of predetermined bottom sediment types. The memory module 665 may store the probabilities of the bottom sediment types used for the display of the previous texture (i.e., the probabilities determined 20 transmissions and receptions earlier), or may store the probabilities obtained for each transmission and reception.

The bottom-sediment-texture-count calculation module 666 calculates the texture count necessary for each of the bottom sediment types. This calculation is performed based on the total count of the textures calculated by the texture-total-count calculation module 664, and the probabilities of the bottom sediment types calculated by the bottom sediment determination module 52. For example, the calculation may be performed so that the texture count corresponding to each bottom sediment type is proportional to the probability of the bottom sediment type. Alternatively, the calculation module 666 may calculate the texture count based on an average value of the probabilities of the bottom sediment types calculated by the bottom-sediment determination module 52 and past probabilities of the bottom sediment types stored in the bottom-sediment memory module 665, or may calculate it based on a correlation thereof. Thus, by taking the past information on the bottom sediment into consideration, error factors can be reduced to provide the user with more accurate information.

The irregular display module 667 displays the textures sequentially to the bottom end of the display screen so that the textures are arranged in an irregular pattern. The method of irregularly displaying the textures is similar to that of the irregular display module 663 in Embodiment 1. However, in this embodiment, the textures to be displayed may be two or more types. Therefore, by presetting the order or priorities of the various types of the textures to be displayed, the overlapping textures may be stably and uniformly displayed on the display screen even when they are updated from the side of the display screen (i.e., from the right in this embodiment). For example, a predetermined display order may be set so as to have overlying priorities of rocks, sands, stones and mud from the top to the bottom.

Next, a calculation method of the total count of the textures calculated by the texture-total-count calculation module 664 and the count of each texture calculated by the bottom-sediment-texture-count calculation module 666 will be explained referring to Table 1.

If the display range of the underwater detection device 2 in this embodiment is 200 m, 720 dots serves as an area showing the bottom among 800 dots of the vertical dimension of the display screen. Further, when sequentially displaying the textures so as to be overlapped for each other by approximately an ¼ of each texture from the bottom (20 m in depth) to the bottom end of the display screen (200 m in depth), an area to be occupied by a texture is 30×¾=22.5 dots in the vertical direction. Therefore, in this case, the required texture count is 720/22.5=32 pieces. When the calculated texture count is not an integer value in the above case, decimal points may be rounded.

Preferably, in this embodiment, a rate of the texture counts of the rocks and sands may be approximately 70:30 so that each type of the textures to be displayed corresponds to the probability of the bottom sediment type as shown in Table 1. That is, after displaying 22 pieces of the rock textures sequentially from the corresponding display position, 10 pieces of the sand textures may be displayed. As described above, the priority between rocks and sands is rocks and, then, sands from the top. Thus, the irregular display module 667 displays the textures based on the calculated counts and types, and the priorities, as described later.

Alternatively, each texture count may also be calculated based on the past bottom sediment data stored in the bottom-sediment memory module 665. For example, the texture count corresponding to each bottom sediment type may be calculated based on an average of the probability included in the bottom sediment data calculated before 20 transmissions stored in the bottom-sediment memory module 665, and the probability included in the bottom sediment data calculated by the bottom-sediment determination module 52.

TABLE 2

| Parameter | Depth | Rocks | Sands | Stones | Mud |
|---|---|---|---|---|---|
| Data | 20 m | 50 (%) | 50 (%) | 0 (%) | 0 (%) |

Specifically, for example, as shown in Table 2 above, when the probability of rocks is 50%, sands 50%, stones 0% and mud 0% in the bottom sediment data calculated before 20 transmissions, averages of the probabilities shown in Table 1 and these probabilities may be calculated. As a result, the average of rocks may be 60%, sands 40%, stones 0% and mud 0%. Then, the texture count for each bottom sediment type may be calculated based on the average. Then, after sequentially displaying 19 pieces of the rock textures from the corresponding display position, 13 pieces of the sand textures may be displayed so that a rate of the rock and sand textures may be approximately 60:40.

Further, the irregular display module 667 displays each type of textures based on the total count of the texture calculated by the texture-total-count calculation module 664 and the count of the bottom sediment textures calculated by the bottom-sediment-texture-count calculation module 666, downward from the bottom, as described above. In this embodiment, as similar to the irregular display module 663 in Embodiment 1, the module 667 irregularly displays the textures so as to be overlapped for each other in a range of 5-10 dots (approximately, ¼ of a texture) in the vertical direction and ±5 dots in the horizontal direction.

Figure 8:
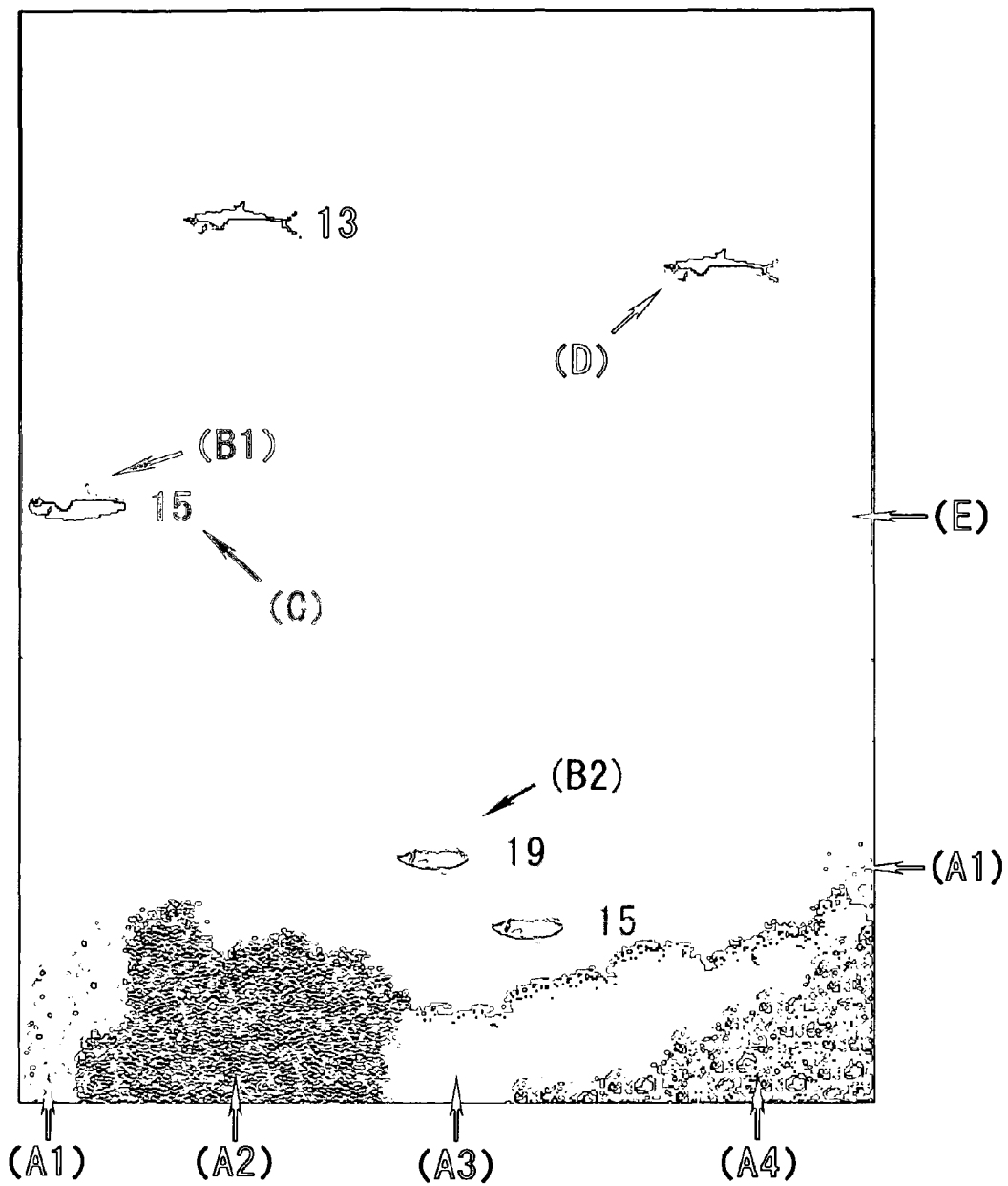
FIG. 8 is a view showing a display configuration of the underwater detection device shown in FIG. 7.

FIG. 8 shows a display example displayed as described above by the underwater detection device 2. In FIG. 8, A1-A4 are the textures displayed by the bottom-sediment display module 66', and are in an order of rocks, sands, stones and mud. B1 and B2 are the textures displayed by the fish-type display module 63, and represent fish types in accordance with the water depth. "C" represents a fish length (cm) of the fish displayed by the fish-length display module 62, and the fish texture without the indication of fish length can be considered as a shoal of fish. "E" is a background displayed by the water-depth-variation display module 64, to which darker gradation for deeper in water depth is applied. Although FIG. 8 is indicated by gray scale for purpose, the underwater detection device 2 may be capable of displaying by color scale.

Further, a customization feature may also be added to the device so that the background can be changed based on the textures of bottom or fish, water depth and water temperature. Further, the textures and background may be imported from an external memory to enhance a variation thereof. Further, the textures and background may be changed by user's preference. Further, the textures used for a bottom sediment type may be two or more types.

What is claimed is:

1. An underwater detection device for detecting underwater by transmission and reception of an ultrasonic signal, comprising:
   a transmission module for transmitting the ultrasonic signal underwater;
   a reception module for receiving an echo signal of the transmitted ultrasonic signal;
   a detection module for detecting positions of targets based on the echo signal received by the reception module; and
   a display module for displaying on a display screen a color representative of water temperature at positions where no targets are detected by the detection module.

2. The underwater detection device of claim 1, wherein the display module displays the color representative of water temperature by displaying different colors corresponding to different water temperatures.

3. The underwater detection device of claim 2, wherein the display module displays each of the different colors with gradations corresponding to different water depths.

4. The underwater detection device of claim 3, wherein the display module applies the different gradations only to a predetermined water depth range.

5. The underwater detection device of claim 1, wherein the display module varies a texture representing the targets on the display depending on a water depth.

6. The underwater detection device of claim 1, further comprising a fish-type determination module for determining a type of fish of the targets based on at least one of the echo signal, water temperature, water quality, water area and water depth.

7. The underwater detection device of claim 6, wherein the display module displays a texture representing the fish type based on the fish type determined by the fish-type determination module.

8. The underwater detection device of claim 7, wherein the texture representing the determined fish type is displayed so that a center of gravity of an area corresponding to the position of the fish and a center of gravity of the texture are arranged at a same location on the display screen.

9. An underwater detection method for detecting underwater by transmission and reception of an ultrasonic signal, comprising:
   transmitting the ultrasonic signal underwater;
   receiving an echo signal of the transmitted ultrasonic signal;
   detecting a position of targets based on the received echo signal; and
   displaying a color representative of water temperature at positions where no targets are detected.

10. The underwater detection device of claim 1, wherein the targets comprise fish.

11. The underwater detection device of claim 1, wherein the targets comprise a bottom surface.

12. The underwater detection device of claim 5, wherein the targets comprise fish.

13. The underwater detection device of claim 1, wherein the detection module detects the positions of the targets at each position within the echo signal whether or not a target echo is present.

14. The underwater detection device of claim 13, wherein the targets are at least one of fish and a bottom surface.

* * * * *